United States Patent
Roberts et al.

(10) Patent No.: US 10,909,531 B2
(45) Date of Patent: Feb. 2, 2021

(54) SECURITY FOR MOBILE APPLICATIONS (71) Applicant: MasterCard International Incorporated, Purchase, NY (US)

(72) Inventors: David A. Roberts, Warrington (GB); Patrik Smets, Nijlen (BE); Mehdi Collinge, Braine-l'Alleud (BE); Axel Cateland, Scarsdale, NY (US)

(73) Assignee: Mastercard International Incorporated, Purchase, NY (US)

( * ) Notice: Subject to any disclaimer, the term of this patent is extended or adjusted under 35 U.S.C. 154(b) by 497 days.

(21) Appl. No.: 14/712,343

(22) Filed: May 14, 2015

(65) Prior Publication Data
US 2015/0348026 A1 Dec. 3, 2015

(30) Foreign Application Priority Data

May 14, 2014 (GB) .................................. 1408539.3

(51) Int. Cl.
*G06Q 20/38* (2012.01)
*G06Q 20/10* (2012.01)
(Continued)

(52) U.S. Cl.
CPC ......... *G06Q 20/3829* (2013.01); *G06F 21/31* (2013.01); *G06Q 20/02* (2013.01);
(Continued)

(58) Field of Classification Search
CPC ............... G06Q 20/3829; G06Q 20/10; G06Q 20/3224; G06Q 20/3278; G06Q 20/40145;
(Continued)

(56) References Cited

U.S. PATENT DOCUMENTS 8,627,414 B1 * 1/2014 McCune ............... H04L 9/3234
709/212
8,640,194 B2 * 1/2014 Inoue ..................... G06F 21/52
713/182
(Continued)

FOREIGN PATENT DOCUMENTS

WO WO-2013158977 A1 * 10/2013 ............... H04L 9/28
WO WO-2015132244 A1 * 9/2015 ......... G06Q 20/3829

OTHER PUBLICATIONS

Zaheer Ahmad et al., "Enhancing the Security of Mobile Applications by using TEE and (U)SIM," 2013, IEEE 10th International Conference on Ubiquitous Intelligence & Computing and 2013 IEEE 10th International Conference on Autonomic & Trusted Computing, pp. 575-582. (Year: 2013).*
(Continued)

*Primary Examiner* — Kenneth Bartley
(74) *Attorney, Agent, or Firm* — Buckley, Maschoff & Talwalkar LLC (57) ABSTRACT

A mobile computing device has at least one processor and at least one memory together providing a first execution environment and a second execution environment logically isolated from the first execution environment. The following approach is taken to manage data items for an application executing the first execution environment. A trust relationship is established between a trust client in the second execution environment and a remote trusted party and the trust client receives one or more data items from the remote trusted party. On executing the application in the first execution environment, the trust client provides the data items or further data items derived therefrom to the application. Provision of these data items may be conditional upon a user authentication process. A suitable mobile computing device is also described.

13 Claims, 3 Drawing Sheets

(51) Int. Cl.
*G06Q 20/32* (2012.01)
*G06Q 20/40* (2012.01)
*H04W 12/06* (2009.01)
*H04W 12/04* (2009.01)
*G06Q 20/02* (2012.01)
*H04W 12/08* (2009.01)
*H04W 12/00* (2009.01)
*G06F 21/31* (2013.01)
*H04L 29/06* (2006.01)

(52) U.S. Cl.
CPC ......... *G06Q 20/10* (2013.01); *G06Q 20/3224* (2013.01); *G06Q 20/3226* (2013.01); *G06Q 20/3227* (2013.01); *G06Q 20/3278* (2013.01); *G06Q 20/3825* (2013.01); *G06Q 20/3827* (2013.01); *G06Q 20/4012* (2013.01); *G06Q 20/40145* (2013.01); *H04W 12/0027* (2019.01); *H04W 12/04* (2013.01); *H04W 12/06* (2013.01); *H04W 12/0806* (2019.01); *H04L 63/0861* (2013.01)

(58) Field of Classification Search
CPC ........... G06Q 20/4012; G06Q 20/3825; G06Q 20/02; G06Q 20/3227; G06Q 20/3226; G06Q 20/3827; G06Q 20/38; G06Q 20/32; G06Q 20/40; H04W 12/06; H04W 12/04; H04W 12/0806; H04W 12/0027; H04W 12/08; H04W 12/00; G06F 21/31; H04L 63/0861; H04L 29/06
See application file for complete search history.

(56) References Cited

U.S. PATENT DOCUMENTS

| | | | |
|---|---|---|---|
| 9,317,689 B2* | 4/2016 | Aissi | G06F 21/30 |
| 9,391,967 B2* | 7/2016 | Bakshi | H04L 9/3234 |
| 9,467,430 B2* | 10/2016 | Smith | H04L 9/0822 |
| 9,705,869 B2* | 7/2017 | Smith | G06F 21/316 |
| 10,270,748 B2* | 4/2019 | Briceno | H04L 63/08 |
| 10,374,799 B2* | 8/2019 | Tamrakar | G06F 21/335 |
| 10,432,620 B2* | 10/2019 | Smets | H04L 63/0861 |
| 10,460,314 B2* | 10/2019 | Hird | H04L 63/062 |
| 10,510,055 B2* | 12/2019 | Desai | G06Q 20/3278 |
| 2007/0094501 A1* | 4/2007 | Takamizawa | G06F 21/32 713/170 |
| 2007/0198432 A1* | 8/2007 | Pitroda | G06Q 20/02 705/64 |
| 2007/0199046 A1* | 8/2007 | O'Brien | G06F 21/72 726/2 |
| 2009/0103730 A1* | 4/2009 | Ward | G06Q 20/02 380/258 |
| 2009/0164797 A1* | 6/2009 | Kramer | G06F 21/32 713/186 |
| 2010/0031325 A1* | 2/2010 | Maigne | G06F 9/45533 726/4 |
| 2010/0306076 A1* | 12/2010 | Taveau | G06Q 20/02 705/26.8 |
| 2010/0306107 A1* | 12/2010 | Nahari | G06Q 20/02 705/44 |
| 2011/0060913 A1* | 3/2011 | Hird | G06F 21/34 713/184 |
| 2012/0331550 A1* | 12/2012 | Raj | G06F 21/53 726/22 |
| 2013/0060959 A1* | 3/2013 | Taveau | H04W 12/08 709/232 |
| 2013/0097698 A1* | 4/2013 | Taveau | G06Q 30/06 726/19 |
| 2013/0117573 A1* | 5/2013 | Harbige | G06F 21/31 713/183 |
| 2013/0151400 A1* | 6/2013 | Makhotin | G06Q 20/3227 705/39 |
| 2013/0159186 A1* | 6/2013 | Brudnicki | G06Q 20/227 705/44 |
| 2013/0268437 A1* | 10/2013 | Desai | G06Q 20/08 705/41 |
| 2013/0281058 A1* | 10/2013 | Obaidi | H04W 12/06 455/411 |
| 2014/0007120 A1* | 1/2014 | Spitz | G06F 21/57 718/102 |
| 2014/0007251 A1* | 1/2014 | Spitz | G06F 21/36 726/26 |
| 2014/0075567 A1* | 3/2014 | Raleigh | H04W 12/10 726/26 |
| 2014/0096226 A1* | 4/2014 | Barkan | G06F 21/57 726/11 |
| 2014/0101734 A1* | 4/2014 | Ronda | G06F 21/6227 726/5 |
| 2014/0108786 A1* | 4/2014 | Kreft | G06F 21/71 713/156 |
| 2014/0172721 A1* | 6/2014 | Weiss | G06F 21/42 705/64 |
| 2014/0236842 A1* | 8/2014 | Salminen | G06Q 20/20 705/75 |
| 2014/0289833 A1* | 9/2014 | Briceno | H04L 63/08 726/7 |
| 2015/0019442 A1* | 1/2015 | Hird | H04L 63/062 705/71 |
| 2015/0120472 A1* | 4/2015 | Aabye | G06Q 20/322 705/16 |
| 2015/0121068 A1* | 4/2015 | Lindemann | H04L 63/0823 713/158 |
| 2015/0244711 A1* | 8/2015 | Venkataraman | H04L 63/0823 713/156 |
| 2015/0245213 A1* | 8/2015 | Dietze | G06F 21/53 455/410 |
| 2015/0248668 A1* | 9/2015 | Radu | G06F 21/14 705/71 |
| 2015/0280922 A1* | 10/2015 | Sibert | G06F 21/51 713/176 |
| 2015/0294304 A1* | 10/2015 | Donnellan | G06Q 20/12 705/44 |
| 2015/0371050 A1* | 12/2015 | Martini | G06F 21/556 726/26 |
| 2016/0020906 A1* | 1/2016 | Nolte | H04L 9/3234 705/71 |
| 2016/0087957 A1* | 3/2016 | Shah | H04L 63/205 726/1 |
| 2016/0210620 A1* | 7/2016 | Taveau | G06Q 20/382 |
| 2017/0109751 A1* | 4/2017 | Dunkelberger | G06Q 20/4014 |
| 2017/0180136 A1* | 6/2017 | Ibasco | H04L 9/3226 |

OTHER PUBLICATIONS

Balfanz, Dirk et al. "FIDO U2F Raw Message Formats", FIDO Alliance Proposed Standard, Oct. 9, 2014, Version 1.0, downloaded from http://www.fidoalliance.org/specs/fido-u2f-raw-message-formats-v1.0-ps-20141009.html,10pgs.

Srinivas, Sampath et al. "Universal 2nd Factor (U2F) Overview", FIDO Alliance Proposed Standard, Oct. 9, 2014, Version 1.0, downloaded from http://www.fidoalliance.org/specs/fido-u2f-overview-v1.0-ps-20141009.html,10pgs.

Balfanz, Dirk et al. "FIDO U2F Javascript API", FIDO Alliance Proposed Standard, Oct. 9, 2014, Version 1.0, downloaded from http://www.fidoalliance.org/specs/fido-u2f-javascript-api-v1.0-ps-20141009.html, 7pgs.

Balfanz, Dirk "FIDO U2F Implementation Considerations", FIDO Alliance Proposed Standard, Oct. 9, 2014, Version 1.0, downloaded from http://www.fidoalliance.org/specs/fido-u2f-implementation-considerations-v1.0-ps-20141009.html, 6pgs.

Ehrensvard, Jakob et al. "FIDO U2F HID Protocol Specification", FIDO Alliance Proposed Standard, Oct. 9, 2014, Version 1.0, downloaded from http://www.fidoalliance.org/specs/fido-u2f-hid-protocol-v1.0-ps-20141009.html,14pgs.

Lindemann, Rolf et al. "FIDO Security Reference", FIDO Alliance Proposed Standard, Oct. 9, 2014, Version 1.0, downloaded from (56) References Cited

OTHER PUBLICATIONS htttps://www.fidoalliance.org/specs/fido-u2f-uaf-authnr-metadata-service-v1.0-ps-20141009.html,14pgs.

Lindemann, Rolf et al. "FIDO Technology Glossary", FIDO Alliance Proposed Standard, Oct. 9, 2014, Version 1.0, downloaded from https://www.fidoalliance.org/specs/fido-glossary-v1.0-ps-20141009.html,15pgs.

Balfanz, Dirk et al. "FIDO AppID and Facet Specification v1.0", FIDO Alliance Proposed Standard, Oct. 9, 2014, downloaded from https://www.fidoalliance.org/specs/fido-appid-and-facets-v1.0-ps-20141009.html, 6pgs.

Machani, Salah et al. "FIDO UAF Architectural Overview", FIDO Alliance Proposed Standard, Dec. 8, 2014, Version 1.0, downloaded from https://www.fidoalliance.org/specs/fido-uaf-v1.0-ps-20141208/fido-uaf-overview-v1.0-ps-2014-12-08.html, 9pgs.

Lindemann, Rolf et al. "FIDO UAF Protocol Specification", FIDO Alliance Proposed Standard, Dec. 8, 2014, Version 1.0, downloaded from https://www.fidoalliance.org/specs/fido-uaf-v1.0-ps-20141208/fido-protocol-v1.0-ps-2014-12-08.html, 39pgs.

Hill, Brad et al. "FIDO UAF Application API and Transport Binding Specification Version 1.0", FIDO Alliance Proposed Standard, Dec. 8, 2014, downloaded from https://www.fidoalliance.org/specs/fido-uaf-v1.0-ps-20141208/fido-uaf-client-api-transport-v1.0-ps-2014-12-08.html, 23pgs.

Baghdasaryan, Davit et al. "FIDO UAF Authenticator-Specific Module API", FIDO Alliance Proposed Standard, Dec. 8, 2014, downloaded from https://www.fidoalliance.org/specs/fido-uaf-v1.0-ps-20141208/fido-uaf-asm-api-v1.0-ps-2014-12-08.html, 28pgs.

Baghdasaryan, Davit "FIDO UAF Authenticator Commands v1.0", FIDO Alliance Proposed Standard, Dec. 8, 2014, downloaded from https://www.fidoalliance.org/specs/fido-uaf-v1.0-ps-20141208/fido-uaf-authnr-cmds--v1.0-ps-2014-12-08.html, 28pgs.

Hill, Brad et al. "FIDO UAF Authenticator Metadata Statements", FIDO Alliance Proposed Standard, Dec. 8, 2014, downloaded from https://www.fidoalliance.org/specs/fido-uaf-v1.0-ps-20141208/fido-uaf-authnr-metadata-v1.0-ps-2014-12-08.html, 15pgs.

Lindemann, Rolf "FIDO UAF Authenticator Metadata Service v1.0", FIDO Alliance Proposed Standard, Dec. 8, 2014, downloaded from https://www.fidoalliance.org/specs/fido-uaf-v1.0-ps-20141208/fido-uaf-authnr-metadata-service-v1.0-ps-2014-12-08.html, 12pgs.

Lindemann, Rolf et al. "FIDO UAF Registry of Predefined Values", FIDO Alliance Proposed Standard, Dec. 8, 2014, downloaded from https://www.fidoalliance.org/specs/fido-uaf-v1.0-ps-20141208/fido-uaf-reg-v1.0-ps-2014-12-08.html, 12pgs.

Balfanz, Dirk et al. "FIDO AppID and Facet Specification v1.0", FIDO Alliance Proposed Standard, Dec. 8, 2014, downloaded from https://www.fidoalliance.org/specs/fido-uaf-v1.0-ps-20141208/fido-appid-and-facets-v1.0-ps-2014-12-08.html, 6pgs.

Lindemann, Rolf et al. "FIDO Security Reference", FIDO Alliance Proposed Standard, Dec. 8, 2014, downloaded from https://www.fidoalliance.org/specs/fido-uaf-v1.0-ps-20141208/fido-security-ref-v1.0-ps-2014-12-08.html, 14pgs.

Lindemann, Rolf et al. "FIDO Technical Glossary", FIDO Alliance Proposed Standard, Dec 8, 2014, downloaded from https://www.fidoalliance.org/specs/fido-uaf-v1.0-ps-20141208/fido-glossary-v1.0-ps-2014-12-08.html, 12pgs.

\* cited by examiner

SECURITY FOR MOBILE APPLICATIONS

CROSS-REFERENCE TO RELATED APPLICATION

This application is a U.S. National Stage filing under 35 U.S.C. § 119, based on and claiming benefit of and priority to GB Patent Application No. 1408539.3 filed May 14, 2014.

FIELD OF DISCLOSURE

This disclosure relates generally to security for mobile applications. Embodiments relate to authentication of a user on a mobile device using a trusted execution environment.

BACKGROUND OF DISCLOSURE

Payment cards such as credit cards and debit cards are very widely used for all forms of financial transaction. The use of payment cards has evolved significantly with technological developments over recent years. Many payments are made at a retail location, typically with a physical transaction card interacting with a point of sale (POS) terminal to perform a transaction. These transaction cards may interact with a POS by swiping through a magnetic stripe reader, or for a "chip card" or "smart card" by direct contact with a smart card reader (under standard ISO/IEC 7816) or by contactless interaction through local short range wireless communication (under standard ISO/IEC 14443).

The present applicants have developed a proprietary system, known as PayPass®, for performing contactless transactions. The present applicants have also appreciated that it would be possible to use a computing device such as a mobile telephone as a proxy for a payment card. They have also developed a mobile payment application, Mobile PayPass™, which can be downloaded to a mobile cellular telephone handset (hereafter "mobile phone") to act as a proxy for a payment card using Near Field Communication (NFC) technology standards, which are built in to the majority of current mobile phones. NFC is a development upon RFID, and NFC-enabled devices are able to operate in the same manner as RFID devices—though an NFC-device is active rather than passive, as it is powered by the mobile phone battery rather than relying on inductive pickup from a reader device. Using Mobile PayPass™, a user can conduct tapping based transactions with a proximity reader, as well as perform account management operations over an appropriate network interface (cellular, local wireless network) in an online banking interface with the user's account provider.

Other mobile payment applications and associated services exist, and typically have a similar functionality. Examples are Apple Pay (operating on iOS devices) and Google Wallet (operating on Android devices).

Mobile payment applications require access to sensitive data for their operation. There are known mechanisms for holding secure data and performing secure operations on a mobile device. One approach is to use a secure element (SE) in the mobile device. A conventional SE is a tamper-resistant physical device, generally physically and logically protected to allow operations and data taking place it to be trusted by other system elements. Another approach is to use a trusted execution environment (TEE)—this is an isolated execution environment provided by the main processor of the mobile device adapted so that code and data loaded within it is confidential and integrity protected. The TEE operates in parallel to the main operating system of the mobile device. For Android devices, a software architecture termed host card emulation (HCE) has been introduced (from Android 4.4 onwards) to provide representations of electronic identity using software alone without the use of a secure element—this has been used to achieve transactions using near field communication (NFC) protocols.

Neither an SE nor a TEE is ideal for enabling an application in the main execution environment of the mobile device to use sensitive data. It would be desirable to address this issue without moving significant parts of the functionality of an application in the main execution environment (such as a payment application) into an SE or a TEE.

SUMMARY OF DISCLOSURE

In a first aspect, the disclosure provides a method of managing data items for an application in a mobile computing device, the mobile computing device having at least one processor and at least one memory together providing a first execution environment and a second execution environment logically isolated from the first execution environment, the method comprising: establishing a trust relationship between a trust client in the second execution environment and a remote trusted party, the trust client receiving one or more data items from the remote trusted party; and executing the application in the first execution environment, the trust client providing the data items or further data items derived therefrom to the application.

Using this approach, a mobile application can operate in the (relatively insecure) regular execution environment of a mobile device while taking advantage of a more secure trusted execution environment to manage sensitive data items. This allows payment applications to operate effectively with a limited logical separation allowing sensitive data items to be handled in a trusted manner.

In embodiments, the method further comprises performing a user authentication process, wherein provision of the data items or derived data items by the trust client is conditional on the result of the authentication process. This authentication process may comprise biometric authentication of a user.

This approach can provide a very powerful mechanism to allow a user easy control of sensitive data on a mobile computing device.

Receiving the data items may comprise establishment of a cryptographic key pair. The data items provided by the trust client may comprise one or more keys derived from the cryptographic key pair.

The trust client may be a FIDO client. This allows effective use of pre-existing technical specifications to deliver a new and useful functional result.

The mobile application may be a payment application adapted to enable the mobile computing device to act as a payment device. In this case, the data items may comprise payment credentials, or may comprise management instructions for the payment application.

In this approach, when an authentication process is used as described above, the authentication process may comprise a customer verification method for the payment application. In some such cases, different derived data items are provided by the trust client if the customer verification method is used and if the customer verification method is not used.

In a second aspect, the disclosure provides a mobile computing device comprising at least one processor and at least one memory together providing a first execution environment and a second execution environment logically isolated from the first execution environment, with a mobile application adapted to execute in the first execution environment and a trust client adapted to execute in the second execution environment, wherein the mobile computing device is programmed to perform the method of managing data items for a mobile application as described above.

The mobile computing device may be a mobile telecommunications handset. The mobile computing device may further comprise a physical secure element, wherein the method of managing data items provides authentication services to the secure element.

BRIEF DESCRIPTION OF FIGURES

Embodiments of the disclosure will now be described, by way of example, with reference to the accompanying Figures, of which.

DESCRIPTION OF SPECIFIC EMBODIMENTS

Specific embodiments of the disclosure will be described below with reference to the Figures.

Figure 1:
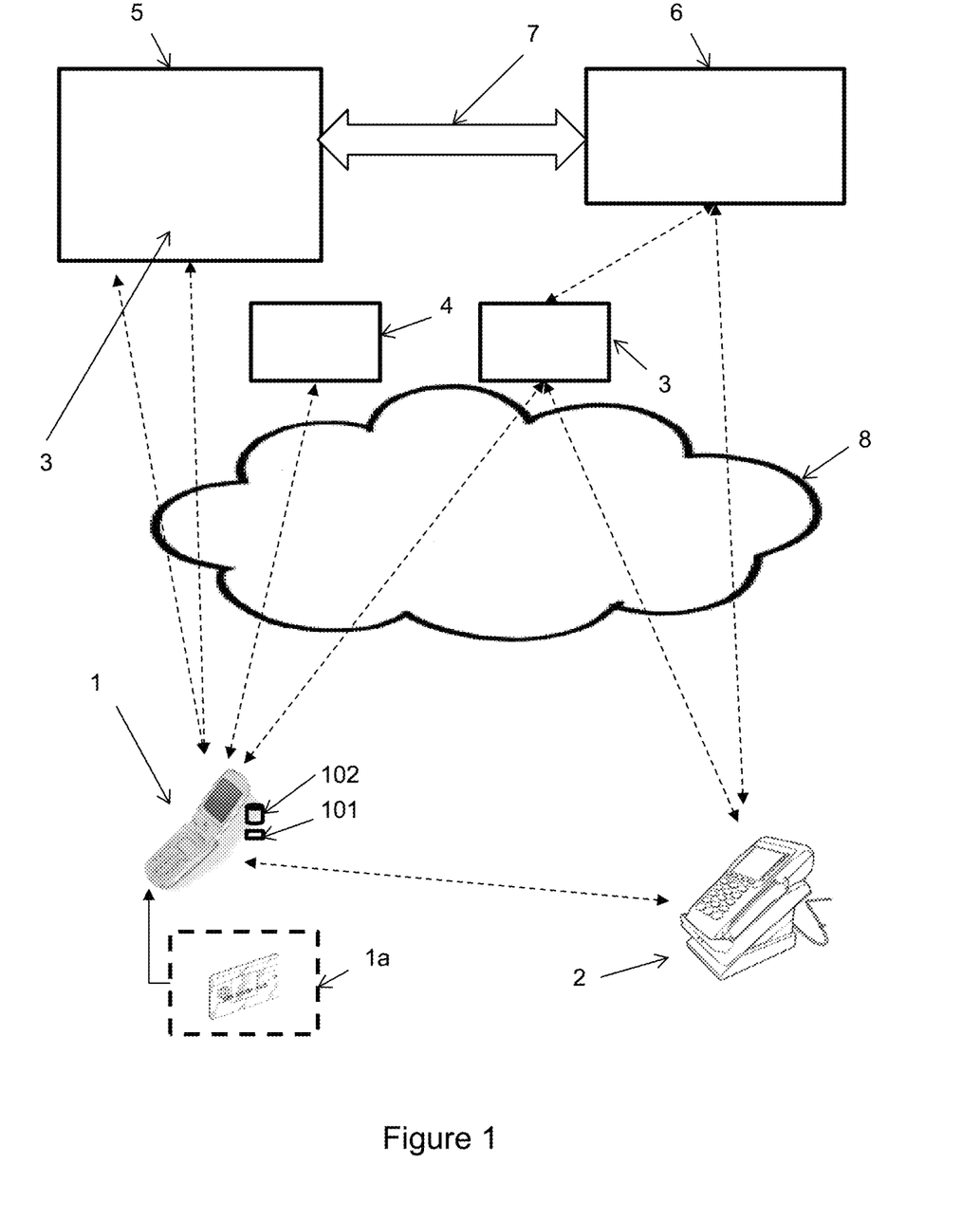
FIG. 1 shows an exemplary transaction system in which embodiments of the disclosure may be used.

FIG. 1 shows an exemplary transaction system in which embodiments of the disclosure may be used.

A user (not shown) is provided with a payment device—this may be for example a mobile phone 1 (or other mobile computing device) acting as a proxy for a payment card 1a. The mobile phone has at least one processor 101 and at least one memory 102 together providing at least one execution environment, as described further below. These devices have firmware and applications run in at least one regular execution environment with an operating system such as iOS, Android or Windows. Payment devices will typically be equipped with means to communicate with other elements of a payment infrastructure. These communication means may comprise antennae and associated hardware and software to enable communication by NFC and associated contactless card protocols such as those defined under ISO/IEC 14443, or they may comprise an antenna and associated hardware and software to allow local wireless networking using 802.11 protocols or any combination of the above. Elements of the mobile phone 1 are shown in more detail in FIG. 2.

Other computer equipment in a conventional infrastructure is typically fixed, but in cases of interest point of interaction (POI) terminals 2 may also be mobile. The example shown is a mobile point-of-sale (MPOS) terminal used by a merchant interacting with the user. Such equipment is typically connected or connectable to an acquiring bank 6 or other system in a secure way (either through a dedicated channel or through a secure communication mechanism over a public or insecure channel—here connection is shown as passing through the public internet 8). Payments may be mediated by a payment gateway 3 acting for a merchant—this may be an internet payment gateway acting for an online merchant, for example. There is also shown a mechanism to allow connection between the user computer devices and a card issuing bank 5 or system associated with the user. A banking infrastructure 7 will also connect the card issuer 5 and the acquiring bank 6, allowing transactions to be carried out between them.

A further element shown in this system is an online authentication service 4. The online authentication service 4 may for example provide on authentication in accordance with one of the standards (UAF for direct authentication and $U_2F$ for second factor authentication) supported by the FIDO Affiance, these specifications are incorporated by reference herein to the extent permissible under applicable law. The role of the online authentication service will be described in more detail below.

Figure 2:
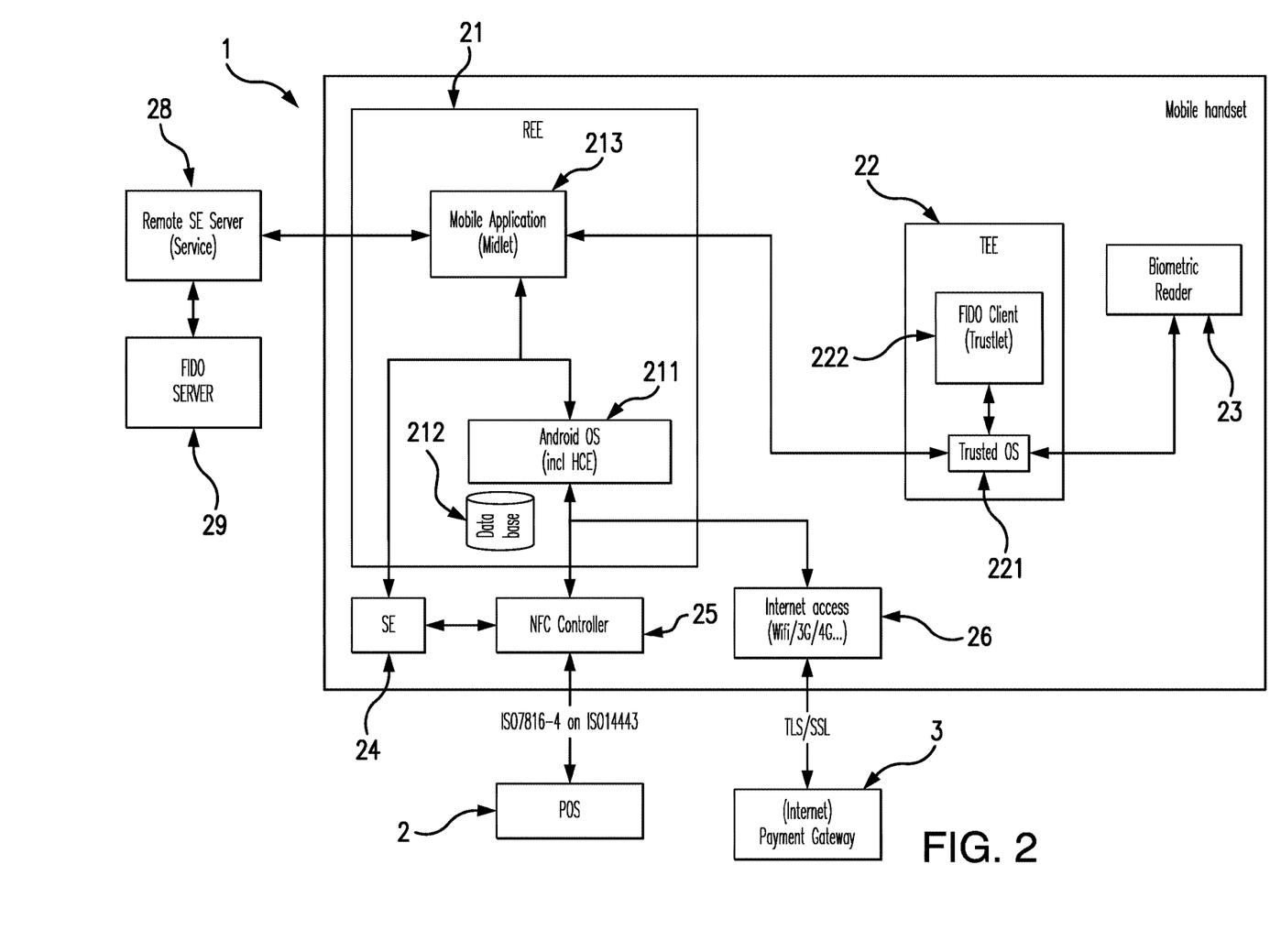
FIG. 2 shows schematically elements of a mobile device suitable for use in embodiments of the disclosure together with other system elements interacting with the mobile device.

FIG. 2 shows in more detail the functional elements of a mobile handset 1 (or other mobile computing device) suitable for implementing embodiments of the disclosure. The mobile handset 1 has at least one processor and at least one memory—these are not shown explicitly in FIG. 2, but between them they provide at least two execution environments.

A first execution environment 21 (regular execution environment or REE) runs the main operating system and is the environment for regular applications running on the mobile handset. Elements shown within the REE are the operating system 211, a database 212 and one or more mobile applications 213. The operating system 211 in this example is Android with host card emulation (HCE), but iOS, Windows or another operating system could be employed in other embodiments. The specific mobile application 213 shown here is a payment application—the term "midlet" is also used below for an application that executes in the REE. Applications are also referred to below as "applets", but may also be designated by a name such as "midlet" indicating where the application runs.

A second execution environment 22 (trusted execution environment or TEE) is logically isolated from the first execution environment—this does not mean that there is no interaction between the first and second execution environments, but rather that the channels for interaction between the two environments are constrained so that data can be held and code can run securely in the second execution environment 22 without risk of leakage to or subversion by processes in the REE. The second execution environment 22 has its own trusted operating system 221 adapted to maintain this logical isolation, and also contains one or more trusted applications 222 adapted to run in this trusted execution environment—the specific trusted application 222 shown is a FIDO client adapted to interact with a remote FIDO server 29 according to FIDO Alliance specifications. Interaction with the FIDO server 29 is provided through a channel comprising the mobile application 213 and a payment application server 28 in a manner described further below—the payment application server 28 and the remote FIDO server 29 essentially correspond to the remote authentication service 4 of FIG. 1. The FIDO client in this case interacts with a user interface device 23, in this case a biometric reader used to provide user authentication input. The term "trustlet" is also used below for an application that executes in the TEE.

Another element shown in the mobile handset 1, but not present in all embodiments, is a secure element (SE) 24. This provides a physically and logically protected execution environment with its own processor and memory, typically located in tamper-resistant hardware. The embodiment discussed below uses Android with HCE, so bypassing the use of an SE for a payment application, but in other embodiments (and for other applications) a physical SE may be used. The term "cardlet" is used below for an application that executes in the SE.

Other elements shown in the mobile handset are an NFC controller 25 for providing contactless interaction with a POS terminal 2 or other point of interaction, and networking communications 26 enabling internet access, for example to a payment gateway 3 through an appropriate protocol such as TSL/SSL.

Embodiments of the disclosure will now be described further in the context of a payment application. Payment applications of two types are discussed—"Remote SE" is used to describe a software-based payment application that does not use a physical secure element on the mobile handset 1, whereas MMP is used to describe payment applications using a physical secure element, such as a dedicated secure element or a mobile phone Universal Integrated Circuit Card (UICC), generally known as a SIM card.

As will be discussed below, particularly effective implementation of and user interaction with a payment application may be achieved by using a trusted execution environment and a suitable user interface for authentication such as a biometric reader. Benefits are provided to in customer convenience, in system security and in cost. Biometric authentication provides simpler operation for the customer. Use of the TEE allows effective protection of critical assets linked to cardholder verification (e.g. a PIN or password) and payment credentials (e.g. Single Use Keys). Separation of business logic into an REE midlet, which is relatively easy to change, and core security mechanisms into the TEE, in a trustlet which is harder to change, provide an efficient and effective partitioning.

In embodiments of the disclosure, functionality provided by a conventional FIDO client is extended to establish keys for usage by mobile applications, in particular applications executing in the regular execution environment. In an embodiment described in detail below, this is achieved by providing an interface for the FIDO client to lodge application keys received from a FIDO server (whose functionality has been extended to support this feature) and to offer cryptographic services to other applications. Other options include embedding FIDO functionality in a TEE trustlet thereby enabling the trustlet to use extended FIDO functionality to establish keys, or to provide an interface for the FIDO client to lodge application keys received from an extended FIDO server and pass them between trustlets.

As will be described below, these cryptographic services may be made conditional on customer verification (eg by PIN or biometrics) being performed or being successful—a different key may for example be provided if verification is not performed.

This approach may be applied to a payment application without a physical secure element on the mobile device (Remote SE). Keys established by the FIDO mechanism may be used for Remote SE management and protection of credentials. This approach also lends itself to use of biometrics—security may be maintained by use of single use keys in the trustlet released for use on biometric authentication.

The approach can be useful even in more conventional payment applications (MMP) that generally use a physical secure element. The payment application can use FIDO established keys to check the integrity and authenticity of information coming from the trustlet (such as the outcome of a customer verification action) and the application will be provided with secure communications from the TEE for PIN entry.

The authentication requirements for Remote SE and MMP will now be described in more detail.

In FIDO, the TEE is used to authenticate a customer through fingerprint or PIN. PIN can be the primary choice of authentication, or PIN can be used when fingerprint is the primary choice but fingerprint validation failed. This referred to as 'fallback to PIN'.

For Remote SE, the TEE is also used to decrypt credentials forwarded from the Remote SE application and to return them decrypted to the Remote SE application. What is returned depends on whether customer verification was performed and whether or not it was successful. Because the TEE exists, an additional level of security can be implemented such that any residual risk to the PIN of exhaustive search starting from a cryptogram and a PIN protected single use key can be eliminated.

The issuer for the Remote SE application may send instructions (through the Remote SE midlet) to the TEE. Instructions include activation and deactivation of TEE support, unblocking or changing the PIN, and so on. The TEE can be used to authenticate the device prior to delivery of credentials. It can also be used to generate a proof that credentials were actually received.

For MMP, the TEE can send the outcome of the customer authentication in a trusted manner to the MMP as the outcome can be authenticated using the symmetric key to provide a message authentication code (MAC). The TEE can send the PIN (or other credentials captured by the TEE) encrypted (and authenticated) to the MMP application, and the application can then validate the PIN (or other credentials) against a local copy and adapt its processing based on the outcome of this comparison.

In an alternative approach (not described further in the detailed embodiments below), the public key pair established through the FIDO protocol for the particular services could be used directly—this is possible provided that the public key is available in the SE/UICC. In this case, the TEE/trustlet would sign the outcome of the customer authentication with the private key and the signature would be validated by MPP (or another application residing in the SE) using the public key.

In considering the arrangement of FIG. 2, there are three significant interfaces for operation of embodiments of the disclosure: remote server(s) and REE; REE and TEE; and SE and TEE (via REE). These are described in detail below. A further interface between trustlets would be required in embodiments in which there is communication of keys between trustlets—this is not described further below, but the position will be analogous to the REE and TEE interface but simplified in that both trustlets lie within the protected TEE environment.

For the Remote SE server and the REE, the following functionality should be supported. The trustlet needs to be registered for the Remote SE service—for a trustlet that is an extended FIDO client, this can be by means of an extended FIDO registration protocol. Payment credentials need to be downloaded for the Remote SE mobile application. Management instructions need to be downloaded for the extended FIDO client.

For the REE and the TEE, the following functionality should be supported. The trustlet needs to be registered for the Remote SE service, as discussed above. There needs to be exchange of downloaded payment credentials. There also needs to be a mechanism to ensure safe forwarding of management instructions.

For the TEE and the SE, where used, there needs to be registration of the trustlet for management of cardholder verification, and a mechanism to provide the outcome of a cardholder verification event.

In an embodiment using FIDO functionality, the following principles of operation can be used to establish keys. The use of FIDO enables the use of a pre-existing certification hierarchy that permits the establishment of a trustworthy key pair using an established cryptographic methodology such as RSA or ECC (ECC will be used in the embodiment discussed further below). The use of server side authentication using TLS/SSL provides confidence in the source of one-time keys—it also limits data origin authentication needs, as the effect would not go beyond denial of service. An initial logon password for the registration phase may be used to link the customer to the Remote SE service. Selection of a registered authenticator in FIDO may be used to link the customer to the mobile device. A set of symmetric keys is then established by a single use of the established keys.

An embodiment of the disclosure will now be described in detail, indicating steps prior to registration, during registration, prior to transaction processing and during transaction processing.

Prior to registration, use is made by the trustlet of its public key chain that allows it to authenticate itself to the Remote SE. This public key chain is not bound to a particular service, and may be the FIDO Attestation Certificate chain. The trustlet is capable of verifying the server side authenticity of the Remote SE server using TLS/SSL and the X.509 certificate chains. The customer is provided with an initial mechanism to establish the service (this may be an initial registration/logon/one time code, or similar) and has a working FIDO implementation with one or more registered authenticators.

During registration, the customer logs on using the initial registration data via the payment midlet. The FIDO server used by the Remote SE server requests registration of the FIDO client. The client will establish a key pair ($PK_{FIDOClient}$ and $PrivK_{FIDOClient}$) and as part of this local user authentication will be triggered. The description of $PK_{FIDOClient}$ and $PrivK_{FIDOClient}$ is given in Table 1 below.

TABLE 1

Initial key pair

| Name | Description | Algorithm |
| --- | --- | --- |
| $PK_{FIDOClient}$ | The public key of the FIDO client for Remote SE authentication, exchanged as part of a registration. When using ECC, as we propose, t is used to form a shared secret from which a set of secret keys may be established. If RSA would be used, it could be used to encrypt $SK_{RemSEServer}$ from Remote SE server towards the mobile handset. | ECC (or RSA) |
| $PrivK_{FIDOClient}$ | The private key of the FIDO client, created at time of device registration and specific to a particular service (provider) - here the Remote SE server. When using ECC, It is used to form a shared secret from which a set of secret keys may be established. If RSA would be used, it could be used to decrypt $SK_{RemSEServer}$ received from the Remote SE server. | ECC (or RSA) |

$SK_{RemSEServer}$ or the shared secret is then used by both parties to derive $SK_{Credentials}$, $SK_{Management}$, $SK_{ReturnedData}$ and $SK_{MAC}$. The role of each of these keys is described in Table 2 below.

TABLE 2

Derived Keys

| | | |
| --- | --- | --- |
| $SK_{Credentials}$ | A secret key determined by the Remote SE server at time of device registration; this is an extension of the FIDO protocol. In our application it is used by the Remote SE server to encrypt and protect payment credentials; the TEE has its own copy that is used to decrypt payment credentials. The solution presented is generic and could be used for other similar purposes | AES |
| $SK_{Management}$ | A secret key determined by the Remote SE server at time of device registration; this is an extension of the FIDO protocol. It is used to protect management instructions sent by the Remote SE server. The TEE has its own version that is used to authenticate the management instructions and - if needed - decrypt sensitive data. | AES |
| $SK_{ReturnedData}$ | A secret key determined by the Remote SE server at time of device registration; this is an extension of the FIDO protocol. In our application it is not used. The solution presented is generic and could be used for other purposes. It is the counterpart of $SK_{Credentials}$. | AES |
| $SK_{MAC}$ | A secret key determined by the Remote SE server at time of device registration; this is an extension of the FIDO protocol. In our application may be used by the Remote SE server to protect management messages intended for the Remote SE application; the TEE has its own copy that is used to verify a MAC on management message. The intent is to provide a mechanism that has backwards compatibility with current issuer host systems script methods. The solution presented is generic and could be used for other similar purposes | 2 key triple DES |

An alternative to the above is for the FIDO server to use the verification result from the FIDO registration protocol to establish a set of symmetric keys ($SK_{Credentials}$ and $SK_{Management}$) between server and client.

Other legacy interfaces can easily be provided in addition to the MAC method described. For example an interface could be added to encipher single use keys. The skilled person will appreciate how such application specific methods may be provided using the principles described here, and these are not included in the discussion below.

In the embodiment described in detail here, an extension to FIDO is used. A server random ECC public key is passed to the FIDO client, which then uses $PrivK_{FIDOClient}$ to derive the shared symmetric keys. In this case, the method used for the establishment of the symmetric keys is as follows.

The FIDO server generates an ephemeral key using the same curve as the client (for example p256—any similar curve could be used).

A secret shared point is established using the server and client keys

The 256 bit x coordinate of the shared point (denoted Z) is partitioned into two parts z0 and z1 and used to generate a key KDK as $$KDK = AES(0)[AES(0)[z0] \oplus z1]$$

where AES(a)[b] means "encipher b using key a using AES-128".

A set of keys are diversified from KDK by enciphering a fixed block where the block is incremented for each operation.

Alternatively, any similar Key Derivation Function may be used, such as one of the KDF functions in ISO/IEC 18033-2.

The set of keys diversified are, in sequence, $SK_{Management}$, $SK_{Credentials}$, $SK_{ReturnedData}$ and $SK_{MAC}$.

It should be noted that in other embodiments, other Key Derivation Functions could be used, for example to establish a diversified set of 256 bit AES keys.

The FIDO client then retains these keys for later use (as noted above, in other embodiments these could be passed to another trustlet). After the Remote SE server sees the first correct transaction from the Remote SE client, it knows that the symmetric keys have been successfully delivered. The key could then be deregistered in the FIDO client to save space.

Prior to transaction processing, the device has thus been registered, a service specific symmetric key (pair) is in place, and $SK_{Credentials}$ and $SK_{Management}$ are established.

A PIN (value) for the customer also needs to be established. This may be selected by the Remote SE server and installed using $SK_{Management}$, or it may be selected by the customer and sent to the Remote SE server using an appropriately secure mechanism. In one approach for cardholder selection of a PIN, the cardholder informs the Remote SE about the chosen PIN and the Remote Server updates the TEE. Because the PIN entered by the cardholder has been decoupled from the PIN exored in transaction processing, a variety of other methods may be used. For example, if the issuer host system cannot store PINs in a recoverable form to permit them to be exored, the PIN could be stored in a salted hashed form as is frequently done for passwords. The trustlet may be told by a management message the salt to use to compute the hashed form, and the trustlet can then modify the key before returning it to the REE. Alternatively, the trustlet might output the salted hashed form without disclosing the PIN or salt so that exhaustive search for the PIN cannot be performed even if the data is compromised whilst permitting the midlet to perform the exor action.

If biometric authentication is to be used, one or more biometric templates need to be registered. An identification of acceptable authentication methods may also need to be updated. The identity of the midlet that may invoke the cryptographic services may be established or changed at this point also. Such data is sent using management messages protected by $SK_{Management}$.

To be ready for transaction processing, the following sensitive assets have therefore been established in the TEE.

TABLE 3

Sensitive Assets in TEE

| | |
|---|---|
| $SK_{Credentials}$ | See Table 2 above |
| $SK_{Management}$ | See Table 2 above |
| $SK_{ReturnedData}$ | See Table 2 above |
| $SK_{MAC}$ | See Table 2 above |
| PIN | A PIN - most likely shared between multiple services |
| Biometric templates | Reference templates - used for comparison. Can be fingerprint, fingervein |

Figure 3:
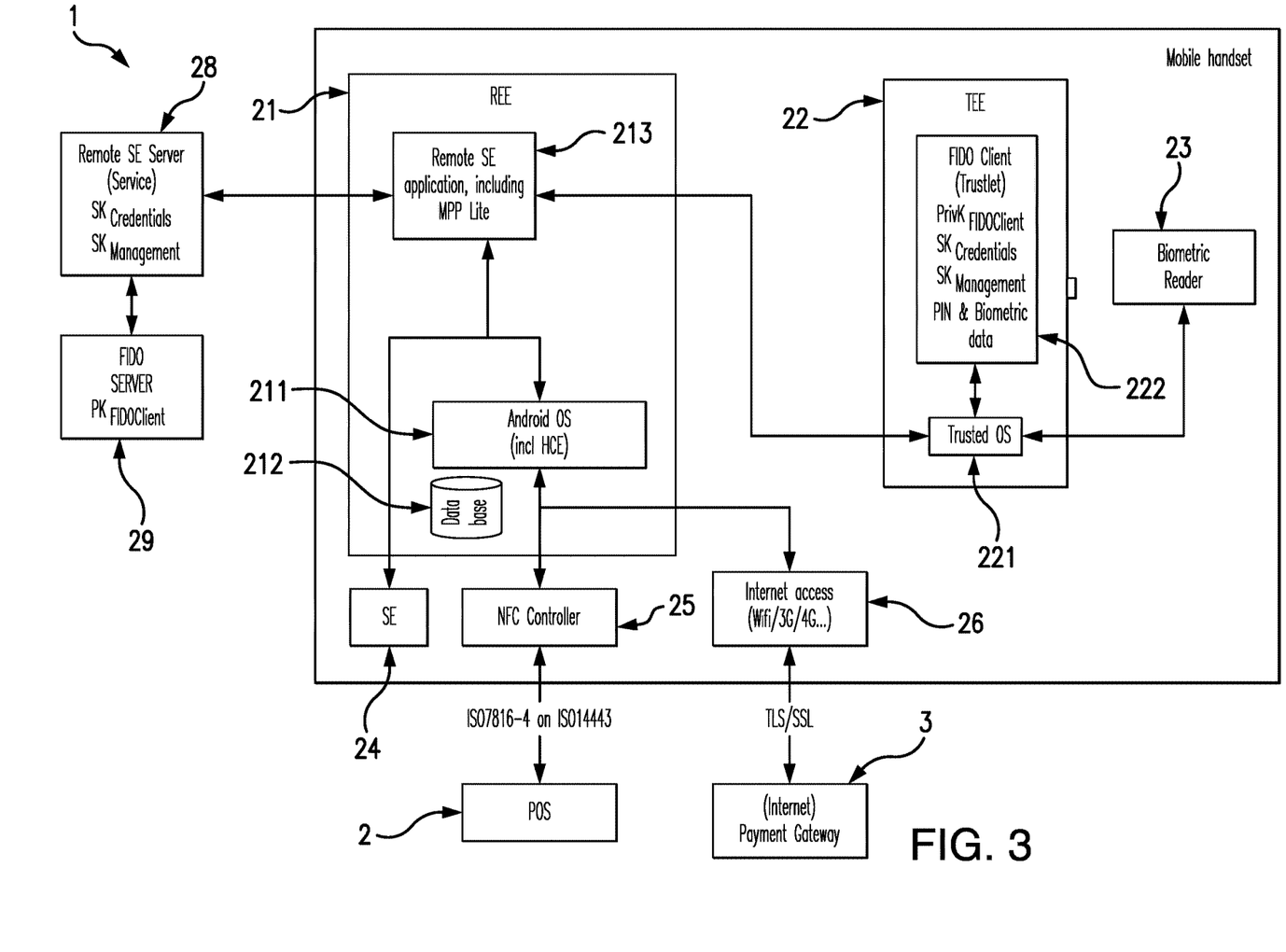
FIG. 3 shows key usage in the arrangement of FIG. 2 according to an embodiment of the disclosure.

The use of these assets in the system of FIG. 2 is illustrated in FIG. 3. The Remote SE server sends encrypted credentials to the trustlet. The Remote SE midlet stores these tokens in the encrypted form that they were received from the Remote SE server. As described below, these are then used during transaction processing.

When a transaction is to be performed, the midlet passes one or more of the tokens received previously to the trustlet for decryption. Typically it will pass on two encrypted messages, one that requires cardholder verification and one that does not. It will receive back either one or two decrypted tokens, typically two keys used for signing transactions—denoted here as $K_{CAM}$ and $K_{CAMCVM}$. The first of these is used for transaction authorization in the absence of cardholder verification, the second for when cardholder verification has been performed.

As indicated above, the Trustlet receives two objects:

The first is an encrypted object indicating that it may be processed regardless of cardholder verification, and the data embedded within the ciphertext is a key $K_{CAM}$ to authenticate the credentials to the issuer, excluding customer verification.

The second is an encrypted object indicating that it may be processed only if cardholder verification has been successful, and the data embedded within the ciphertext is a key $K_{CAMCVM}$ to authenticate the credentials to the issuer, and indicate customer verification Upon successful decryption of the encoded data objects key $K_{CAM}$ is released (=returned) when customer verification was successfully performed or when customer verification was not performed. If customer verification was performed but not successfully, $K_{CAM}$ is not released.

Key $K_{CAMCVM}$ is only released (=returned) if customer verification was successfully performed. If customer verification was not performed or customer verification was performed and not successful $K_{CAMCVM}$ is not released. Prior to its release, in embodiments $K_{CAMCVM}$ may be xor-ed with the PIN (held in the TEE).

A summary is given in Table 4 below.

TABLE 4

Summary of key release results

| Customer verification | $K_{CAM}$ | $K_{CAMCVM}$ |
|---|---|---|
| Not performed | ✓ | x |
| Performed but not successfully | x | x |
| Successfully performed | ✓ | ✓ |

✓ = release
x = no release

After the payment transaction, the midlet may delete the tokens and their original encrypted form. In this way, the Remote SE midlet does not need to store the tokens and the trustlet does not need to understand midlet specific data or processing requirements. The results are as follows:

TABLE 5

Transaction processing results

| $K_{CAM}$ | authenticate the credentials to the issuer, excluding customer verification |
|---|---|
| $K_{CAMCVM}$ | authenticate the credentials as well as the customer to the issuer |

Further details and modifications used in specific embodiments will now be described. Firstly, adoption for an MPP payment application using an SE will be described.

In an MPP approach, a similar trustlet may be used to assist SE processing in a cardlet in regard of cardholder verification. In this case, the provisioning systems deliver a copy of $SK_{Credentials}$ to the cardlet. To get cardholder verification and provide proof to the SE the midlet requests that the trustlet wrap a simple message with the most significant bit of the first byte of a message set (discussed further below) and pass this on to the cardlet. The cardlet knows $SK_{Credentials}$ and can confirm the authenticity of the message. To prevent a replay attack, a prudent extension would be to incorporate in the message to be wrapped either a challenge or nonce from the cardlet to ensure freshness. Other data could also be included in the message.

Similarly such a Wrap function could be used to request and pass a PIN from trustlet to cardlet, for example by using another bit (e.g. Bit 0) in the first byte as a flag. If the flag is set, the trustlet could be requested to return the PIN enciphered under $SK_{ReturnedData}$. The ability to invoke this processing is determined by use of the management interface.

Extensions to FIDO used in embodiments of the disclosure will now be further described, together with their application to Remote SE and MMP.

A single generic mechanism is provided for confidentiality and integrity. A counterpart to this may also be provided to return data securely to a server (this may not be used in a Remote SE application but has application to MPP). A simple MAC mechanism is also provided for legacy support. A management interface is also provided to control to services offered to a midlet.

The generic mechanisms and management interface use CCM with AES as defined in NIST Special Publication 800-38C, which is incorporated by reference to the extent permissible under applicable law—CCM is standardised and widely supported. Other mechanisms such as OCB, GCM, encrypt-then-MAC could also be used. An appropriate simple MAC mode is Retail MAC as defined in ISO/IEC 9797-1 Algorithm 3.

The FIDO management extension provides a management channel for the services provided to a midlet by the trustlet. Specifically it enables the following:
 Enable or disable the wrap, unwrap and MAC services and configure their mode
 Define which midlets may invoke the above services;
 Define acceptable authentication methods
 Configure authentication methods
 Messages are protected with CCM using the key $SK_{Management}$.

Identification of midlets is based on existing mechanisms. When a midlet is deployed, it is signed by its developer (e.g. for Android the application's .apk file is signed). The trustlet checks that the midlet holds a corresponding signature when request for service is received.

The FIDO Unwrap Data process will only be performed if the calling application matches the one expected as a result of a previous management message.

A message to be unwrapped consists of three parts, a header, a plaintext and a ciphertext part. The ciphertext part also contains the MAC. The plaintext is the Associated Data as defined for CCM. The first byte of the plaintext is a control byte that determines the action to be taken. If the first byte is '00' then the message is processed, and if the MAC is correct the deciphered message part is returned. If the most significant bit of the first byte of the message is set, then the message is only processed if cardholder verification has been successfully performed. The key used to process the message is $SK_{Credentials}$. The header contains nonce information for the CCM decryption process. When the midlet invokes the function it must indicate, if cardholder verification is needed, whether it wants the trustlet to ask for cardholder verification if it has not already been provided, or if it is content to receive an error if cardholder verification has not already been performed. Finally, if the option to ex-or the cardholder PIN (or a hashed version of it) with the key is required, this is also indicated by a bit set in the first byte. In this case the PIN is exored into each 8 byte block of the returned data.

Similarly, the FIDO Wrap Data process will only be performed if the calling application matches one expected as a result of a previous management message.

A message to be wrapped consists of two parts, a first part that is plaintext but must be included in the MAC and a second plaintext part that will become ciphertext. The ciphertext output also contains the MAC. The first plaintext part is the Associated Data as defined for CCM. The first byte of this plaintext is a control byte that determines the action to be taken. If the first byte is '00', then the message is processed and a header and ciphertext are returned. If the most significant bit of the first byte of the message is set, then the message is only processed if cardholder verification has been successfully performed. The key used to process the message is $SK_{ReturnedData}$. The header contains nonce information for the CCM decryption process. If processing requires cardholder verification, the trustlet must ask for it. If the least significant bit in the first byte is set, and if the operation has been enabled using the management interface, PIN entry is requested and the PIN is returned in the ciphertext.

In the FIDO Validate MAC process, the message to be validated is presented along with a header. The header contains management information and specifically a 2 byte counter. The counter must be greater than used previously. The message to be validated comprises a message followed by a MAC. The key used to process the message is $SK_{Retail}$ $_{MAC}$. The output is a simple Boolean (OK/Not OK) signifying whether the MAC validated correctly.

Customer (for a payment application, cardholder) authentication will now be considered in more detail, in particular for use of biometrics and for use of a customer PIN.

Biometrics validation may be used to open various services on the TEE—all services that have indicated they accept biometrics as CVM (customer verification method) can use the FIDO extensions as described above. Depending on the configuration of the trustlet, all services that accept biometrics as CVM may accept all services as well, or each service may need to be activated. A biometric application typically has its own FAR/FRR settings (false acceptance rate and false recognition rate)—additional mechanisms would be needed if services were considered to need a different FAR/FRR arrangement.

For PIN management, various options are available. In order to limit the effect on the Remote SE server, it may be desirable to permit existing implementations to continue to support PIN exor methods with the keys, so the trustlet needs to know the PIN to use. In embodiments, the server may be able to omit PIN encipherment.

As discussed above, the PIN that the cardholder enters need not be the same as the PIN exored with the key. The trustlet knows a PIN to exor in order to support biometric use—this may be viewed as a completely separate PIN. The position if the cardholder has forgotten the PIN is considered further below.

For PIN installation and subsequent change by the Remote SE server, the following sequence may be used:
(1) Remote SE server assigns the PIN and
(2) The PIN is communicated to the TEE as part of the "registration procedure"
(3) PIN changes are requested to the issuer/remote SE server and communicated to the TEE through script-like instructions.

In addition to management messages directed to the trustlet itself, in embodiments there are two ways that the trustlet may be used to validate management messages intended for the Remote SE midlet:
By using the generic Unwrap method
By using a legacy MAC method
The latter is provided so that existing host system methods may be reused to manage a remote SE.

Received midlet instructions may be one of the following:
PIN Change/Unblock
Application Block
Application Unblock
Card block
Block biometrics
Unblock biometrics These will be described further below, but can in general adopt a structure used for existing MPP instructions—an instruction can resemble a ISO7816-4 script command (CLA INS P1 P2 . . . MAC). Functionality is only executed if the secure messaging (indicated by MAC) is correct. As the trustlet contained a master key not a session key, the ATC (application transaction counter) value used to derive the session key (if needed) is included in the script command data.

PIN Change/Unblock—Changes or unblocks the PIN for a midlet.
Block application—Suspends TEE services for a midlet.
Unblock application—Resumes TEE services for a midlet.
Card block—Deactivates service for a midlet and erases SK$_{Credentials}$ and SK$_{Management}$.
Block biometrics—Suspends biometrics as a CVM for a midlet
Unblock biometrics—Resumes biometrics as a CVM for a midlet
Authenticate—Provides an authentication code as part of the protocol set-up.

The authentication code authenticates the customer prior to the delivery of credentials. The device and its user are authenticated by FIDO. The combination of authentication code linked to FIDO authentication with a registered authenticator links the account user, phone user and device.

While the discussion of embodiments above relates primarily to payment applications, the person skilled in the art will appreciate that the mechanisms described have broader application—in particular, in use of mobile applications that employ sensitive data and for which a trusted execution environment is available, particularly with a user authentication mechanism such as a biometric system. Moreover, the scope of the disclosure is defined by the spirit and scope of the claims and is not limited by the embodiments described here.

The invention claimed is:

1. A method for a mobile computing device having at least one processor and at least one memory cooperatively operating together to provide a first execution environment and a second execution environment including a trusted operating system and being logically isolated from the first execution environment, the method comprising:

establishing, by the at least one processor, an interaction over a communication channel between a trust client application executing securely in the second execution environment of the mobile computing device and a remote application server, the trusted operating system maintaining logical and physical isolation from the first execution environment and the communication channel including a mobile application executing in the first execution environment of the mobile computing device and the remote application server;

receiving, by the mobile application executing in the first execution environment of the mobile computing device, one or more encrypted data items from the remote application server, the mobile application executing in the first execution environment storing the received encrypted data items and the encrypted data items including authentication credentials related to a user and an indication that the encrypted data items require user verification to be processed;

transmitting, by the at least one processor, the encrypted data items received from the remote application server from the mobile application executing in the first execution environment to the trust client application executing in the second execution environment of the mobile computing device;

determining, by the at least one processor, a reception of a personalized user verification from a user via a secure communication interface connected to the trusted operating system of the second execution environment;

decrypting, by the at least one processor and the trust client application executing in the second execution environment in response to the determined reception of the personalized user verification and in accordance with the indication that the encrypted data items require user verification to be processed, either the data items received from the remote application server or further data items derived from the data items received from the remote application server, the decrypted data items and the decrypted further data items including a single use key;

receiving by the mobile application executing in the first execution environment over a communication channel between the first execution environment and the second execution environment from the trust client application executing in the second execution environment, either the decrypted data items received from the remote application server or the decrypted further data, items derived from the data items received from the remote application server including the single use key; and performing, by the mobile application executing in the first executing environment, a transaction using either the decrypted data items or the decrypted further data items received from the trust client application executing in the second execution environment, by signing the transaction using the single use key from the trust client application executing in the second execution environment.

2. A method as claimed in claim 1, further comprising performing a user authentication process, wherein the decrypted data items received from the trust client application executing in the second execution environment is provided conditional on a result of an authentication process performed by the trust client application.

3. A method as claimed in claim 2, wherein the authentication process comprises biometric authentication of a user.

4. A method as claimed in claim 1, wherein receiving the encrypted data items comprises establishment of a cryptographic key pair.

5. A method as claimed in claim 4, wherein the encrypted data items received from the remote application server comprise one or more keys derived from the cryptographic key pair.

6. A method as claimed in claim 1, wherein the application executing in the first execution environment is a payment application.

7. A method as claimed in claim 6, wherein the encrypted data items comprise payment credentials.

8. A method as claimed in claim 6, wherein the encrypted data items further comprise management instructions for the payment application.

9. A method as claimed in claim 6, further comprising performing a user authentication process, wherein the encrypted data items received from the trust client application is provided conditional on the result of a user authentication process, and the user authentication process comprises a customer verification method for the payment application performed by the trust client application.

10. A method as claimed in claim 9, wherein different derived data items are provided by the trust client if the customer verification method is used and if the customer verification method is not used.

11. A mobile computing device comprising;

at least one processor;

at least one memory, the at least one processor and the at least one memory cooperatively operating to provide a first execution environment and a second execution environment, the second execution environment including a trusted operating system and being logically isolated from the first execution environment;

a mobile application adapted to execute in the first execution environment; and a trust client application adapted to execute in the second execution environment, wherein the mobile computing device is programmed to;

establish an interaction over a communication channel between the trust client application executing securely in the second execution environment of the mobile computing device and a remote application server, the trusted operating system maintaining logical and physical isolation from the first execution environment and the communication channel including a mobile application executing in the first execution environment of the mobile computing device and the remote application server;

receive, by the mobile application executing in the first execution environment of the mobile computing device, one or more encrypted data items from the remote application server, the mobile application executing in the first execution environment storing the received encrypted data items and the encrypted data items including authentication credentials related to a user and an indication that the encrypted data items require user verification to be processed;

transmit, by the at least one processor, the encrypted data items received from the remote application server from the mobile application executing in the first execution environment to the trust client application executing in the second execution environment of the mobile computing device;

determine, by the at least one processor, a reception of a personalized user verification from a user via a secure communication interface connected to the trusted operating system of the second execution environment;

decrypt, by the at least one processor and the trust client application executing in the second execution environment in response to the determined reception of the personalized user verification and in accordance with the indication that the encrypted data items require user verification to be processed, either the data items received from the remote application server or further data items derived from the data items received from the remote application server, the decrypted data items and the decrypted further data items including a single use key;

receive by the mobile application executing in the first execution environment from the trust client application executing in the second execution environment over a communication channel between the first execution environment and the second execution environment, either the received data items decrypted or the decrypted further data items derived from the received data items including the single use key; and perform, by the executing mobile application in the first executing environment, a transaction using either the decrypted data items or the decrypted further data items received from the trust client application executing in the second execution environment, by signing the transaction using the single use key from the trust client application executing in the second execution environment.

12. The mobile computing device of claim 11, wherein the mobile computing device is a mobile telecommunications handset.

13. The mobile computing device of claim 11, wherein the mobile computing device further comprises a physical secure element, and the using of the decrypted data items provides authentication services to the secure element.

* * * * *